(12) United States Patent
Kakuno et al.

(10) Patent No.: US 10,906,484 B2
(45) Date of Patent: Feb. 2, 2021

(54) IN-VEHICLE POWER SUPPLY DEVICE

(71) Applicants: AutoNetworks Technologies, Ltd., Mie (JP); Sumitomo Wiring Systems, Ltd., Mie (JP); Sumitomo Electric Industries, Ltd., Osaka (JP)

(72) Inventors: Yutaka Kakuno, Mie (JP); Tsuguo Nishimura, Mie (JP); Seiji Takahashi, Mie (JP); Takanori Itou, Mie (JP)

(73) Assignees: AutoNetworks Technologies, Ltd., Mie (JP); Sumitomo Wiring Systems, Ltd., Mie (JP); Sumitomo Electric Industries, Ltd., Osaka (JP)

( * ) Notice: Subject to any disclaimer, the term of this patent is extended or adjusted under 35 U.S.C. 154(b) by 13 days.

(21) Appl. No.: 16/479,339

(22) PCT Filed: Jan. 8, 2018

(86) PCT No.: PCT/JP2018/000139
§ 371 (c)(1),
(2) Date: Jul. 19, 2019

(87) PCT Pub. No.: WO2018/135330
PCT Pub. Date: Jul. 26, 2018

(65) Prior Publication Data
US 2019/0337474 A1    Nov. 7, 2019

(30) Foreign Application Priority Data
Jan. 19, 2017    (JP) .................................. 2017-007425

(51) Int. Cl.
*B60R 16/033*    (2006.01)
*H02M 1/08*    (2006.01)
(Continued)

(52) U.S. Cl.
CPC ............. *B60R 16/033* (2013.01); *H02M 1/08* (2013.01); *H02M 3/1584* (2013.01); *H02M 2001/0009* (2013.01)

(58) Field of Classification Search
CPC ....... H02M 2003/1566; H02M 3/1584; H02M 1/08; H02M 2001/0032; H02M 2001/0009; B60R 16/033; Y02T 10/92; H02J 1/00
See application file for complete search history.

(56) References Cited

U.S. PATENT DOCUMENTS

2011/0032733 A1*  2/2011  Watanabe ........... H02M 3/1584
                                                     363/21.14
2012/0062205 A1*  3/2012  Levesque ................ H03F 3/245
                                                     323/318
(Continued)

FOREIGN PATENT DOCUMENTS

JP    2001-204137 A    7/2001
JP    2014-093910 A    5/2014
JP    2015-142396 A    8/2015

OTHER PUBLICATIONS

International Search Report, Application No. PCT/JP2018/000139, dated Feb. 13, 2018. ISA/Japan Patent Office.

*Primary Examiner* — Jared Fureman
*Assistant Examiner* — Duc M Pham
(74) *Attorney, Agent, or Firm* — Honigman LLP

(57) ABSTRACT

An in-vehicle power supply device includes a first voltage conversion unit for performing at least a step-down operation to lower a voltage applied to a first conductive path electrically connected to an in-vehicle power storage unit, and apply the lowered voltage to a second conductive path; a second voltage conversion unit for performing at least the step-down operation to lower a voltage applied to a first conductive path and apply the lowered voltage to a second (Continued)

conductive path, a second voltage conversion unit having a smaller power capacity than the first voltage conversion unit; a driving unit that drives the first voltage conversion unit and the second voltage conversion unit, and a capacitor that is electrically connected to the second conductive path and is charged with a current flowing through the second conductive path.

2 Claims, 5 Drawing Sheets

(51) Int. Cl.
*H02M 3/158* (2006.01)
*H02M 1/00* (2006.01)

(56) References Cited

U.S. PATENT DOCUMENTS

2014/0266131 A1* 9/2014 Deboy .................. H02M 3/158
 323/311
2017/0331374 A1* 11/2017 Hoyerby ................ H02M 1/08

* cited by examiner

IN-VEHICLE POWER SUPPLY DEVICE

CROSS-REFERENCE TO RELATED APPLICATIONS

This application is the U.S. national stage of PCT/JP2018/000139 filed on Jan. 8, 2018, which claims priority of Japanese Patent Application No. JP 2017-007425 filed on Jan. 19, 2017, the contents of which are incorporated herein.

TECHNICAL FIELD

The present disclosure relates to an in-vehicle power supply device.

BACKGROUND

In-vehicle systems are known that supply electric power to two systems, namely a low-voltage system and a high-voltage system, and technology such as that disclosed in JP2001-204137A has been proposed in relation to such systems. JP2001-204137A discloses a power supply circuit that includes a small-capacity DC/DC converter and a large-capacity DC/DC converter that are disposed between a high-voltage direct current power source and a low-voltage load and serve as DC/DC converters that lowers a voltage, and the power supply circuit switches the converter according to the required supply power.

In the DC/DC converters in JP2001-204137A, if an engine key has been switched to an OFF position, for example, a required dark current is constantly supplied by operating the small-capacity DC/DC converter. On the other hand, if the engine key has been switched to a position other than the OFF position, power that is sufficient for a low-voltage direct-current load is supplied by operating the large-capacity DC/DC converter.

Incidentally, if a large current circuit for outputting a relatively large current and a small current circuit for outputting a relatively small current are mixed as in a power supply circuit in JP2001-204137A, there is a problem in that a drive current of the large current circuit is likely to be large because a large element needs to be used, and thus the current consumption is likely to be large also in a control unit for controlling the circuit. As such, in order to suppress the driving of the large-current circuit as much as possible, in a period when there is a high possibility that a current output from the small current circuit will be sufficient (e.g. during parking), it is desirable that power consumption in the whole circuit is suppressed as much as possible by stopping the operation of the large current circuit and operating only the small current circuit.

However, even when there is a high possibility that a current output from the small current circuit will be sufficient (e.g. during parking), a situation in which a relatively large current is required may occur, such as a case where a door lock, a head light, a horn, an indoor lamp, or a plurality of these electrical components are operated by the user operation. In order to address such a case, it is conceivable to apply, to the small current circuit, a configuration capable of handling a current that is large to some extent, but there is a problem in that such a configuration will cause an increase in the circuit size and power consumption. As another solution, it is also conceivable to switch to the large current circuit when a period in which a large current is required arrives. However, if this method is used, there is a problem in that it takes time from when it is detected that the period in which a large current is required has arrived until the large current circuit is actually operated.

The present disclosure has been achieved in view of the above-described circumstances, and aims to provide an in-vehicle power supply device according to which a small current operation and a large current operation can be performed, and a delay in output can be suppressed at the time of switching a small current operation to a large current operation.

SUMMARY

An in-vehicle power supply device according to an aspect of the present disclosure includes a first voltage conversion unit configured to perform at least a step-down operation to lower a voltage applied to a first conductive path electrically connected to an in-vehicle power storage unit, and apply the lowered voltage to a second conductive path. A second voltage conversion unit is configured to perform at least the step-down operation to lower a voltage applied to the first conductive path and apply the lowered voltage to the second conductive path, the second voltage conversion unit having a smaller power capacity than the first voltage conversion unit. A driving unit is configured to drive only the second voltage conversion unit, out of the first voltage conversion unit and the second voltage conversion unit, in a first period, and drive at least the second voltage conversion unit when the first period has shifted to the second period, and a capacitor that is electrically connected to the second conductive path and is charged with a current flowing through the second conductive path, the capacitor is electrically connected to a wiring portion to which a battery is not connected and an in-vehicle load is connected, and the driving unit is configured to start the driving of the first voltage conversion unit using, as a second period, a period after a current flowing through the second conductive path has reached a predetermined current value range or the voltage at the second conductive path has decreased below a predetermined voltage range, in the case where, in the first period, the driving of the first voltage conversion unit is stopped and the second voltage conversion unit is driven, and when only the second voltage conversion unit, out of the first voltage conversion unit and the second voltage conversion unit, is driven, if the current output from the second voltage conversion unit becomes insufficient as a current to be supplied to the load, the current is supplemented by discharge from the capacitor.

Advantageous Effects of Disclosure

With the in-vehicle power supply device according to the above-described aspect, it is possible to operate only the second voltage conversion unit with a small power capacity in the first period, and to continue the output while power consumption is suppressed. Since the circuit size of this second voltage conversion unit need only be of a size suited to a current that is assumed to flow in the first period, the circuit size need not be excessively large, making it easy to optimize the circuit configuration. On the other hand, when the first period is shifted to the second period, it is possible to let a larger current flow by driving the first voltage conversion unit having a relatively large power capacity. Furthermore, the capacitor that can be charged with a current flowing through the second conductive path is electrically connected to the second conductive path that can serve as an output path from the first voltage conversion unit and the second voltage conversion unit. With this configuration, it is possible to compensate an output current to be supplied to the load via the second conductive path with a current from the capacitor when a small current operation using the second voltage conversion unit is switched to a large current operation using the first voltage conversion unit, and therefore a delay until a large current is output from the first voltage conversion unit can be suppressed.

DESCRIPTION OF EMBODIMENTS

The following describes preferred examples of the present disclosure.

The in-vehicle power supply device may also have a current detection unit for detecting a current flowing through the second conductive path. In a case where, in the first period, the driving of the first voltage conversion unit is stopped and the second voltage conversion unit is driven, the driving unit may also start the driving of the first voltage conversion unit using, as a second period, a period after a current flowing through the second conductive path detected by the current detection unit has reached a predetermined current value range.

In the above-described in-vehicle power supply device, when, in the first period, the driving of the first voltage conversion unit is stopped and the second voltage conversion unit is driven, that is, in the case where a current flowing through the second conductive path has increased to reach a predetermined current value range when operating while suppressing power consumption, it is possible to start driving of the first voltage conversion unit to output a larger current. Furthermore, during a period from when a current flowing through the second conductive path has reached the predetermined current value range until a current is actually output from the first voltage conversion unit, an output can be compensated by a current from the capacitor. Accordingly, a delay until the first voltage conversion unit outputs a large current can be effectively suppressed.

The driving unit may also start driving of the first voltage conversion unit using, as a second period, a period after a voltage of the second conductive path has become lower than a predetermined voltage value range, in a case where, in the first period, the driving of the first voltage conversion unit is stopped and the second voltage conversion unit is driven.

When the driving of the first voltage conversion unit is stopped and the second voltage conversion unit is driven in the first period, that is, when operating while suppressing power consumption, in the case where a voltage of the second conductive path has become lower than a predetermined voltage value range, the above-described in-vehicle power supply device can start the driving of the first voltage conversion unit to output a larger current. Furthermore, during a period from when a voltage of the second conductive path has become lower than a predetermined voltage value range until a current is actually output from the first voltage conversion unit, the output can be compensated by a current from the capacitor, and it is possible to effectively suppress a delay until the first voltage conversion unit outputs a large current.

First Embodiment

The following describes a first embodiment as a specific embodiment of the present disclosure.

Figure 1:
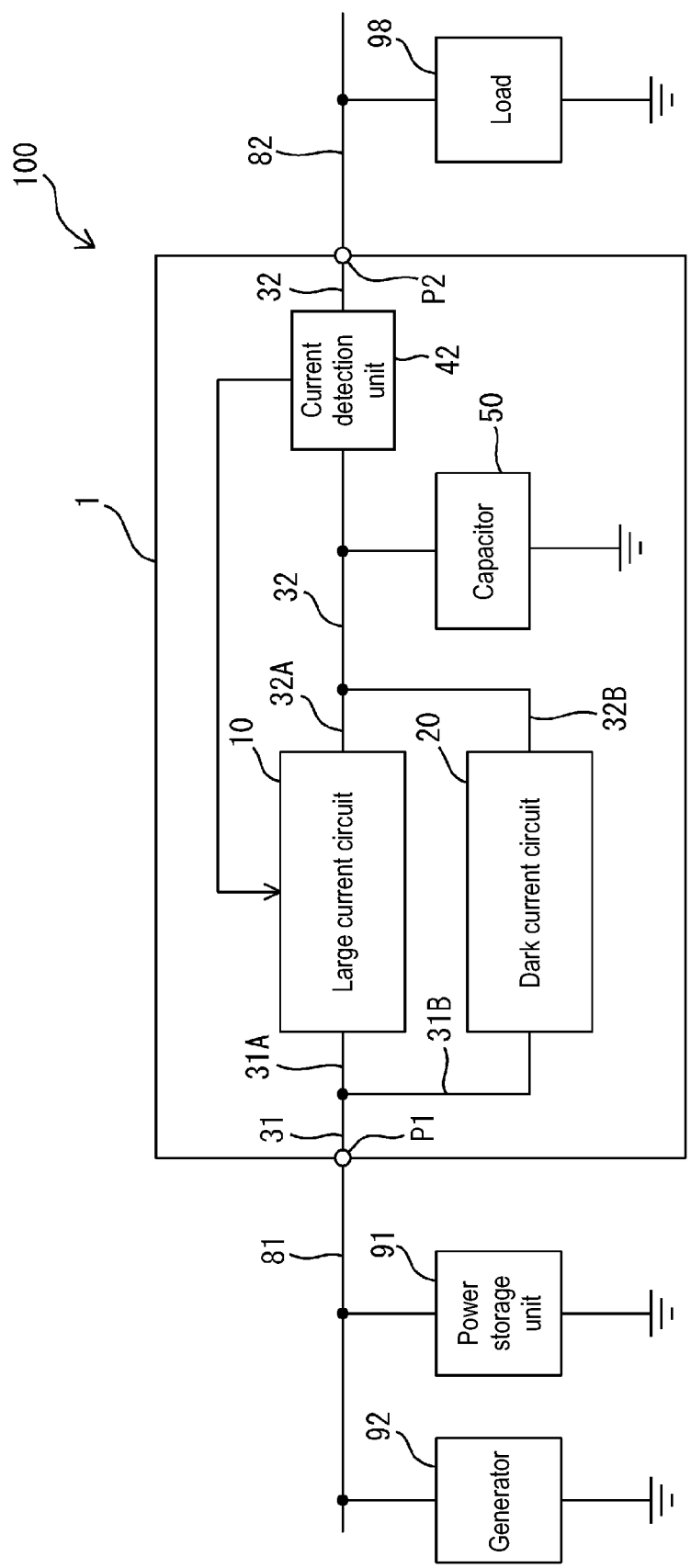
FIG. 1 is a block diagram schematically illustrating an in-vehicle power supply system that includes an in-vehicle power supply device according to a first embodiment.

An in-vehicle power supply system 100 (hereinafter also called "a power supply system 100") illustrated in FIG. 1 is configured as a system that can supply electric power to two systems, namely, a power supply path 81 of a high-voltage system and a power supply path 82 of a low-voltage system. The power supply system 100 is a power supply system that applies a relatively high voltage (for example, about 48 V) to the power supply path 81 of the high-voltage system and applies a relatively low voltage (for example, about 12 V) to the power supply path 82 of the low-voltage system, and is configured as a system that can supply electric power to electric apparatuses that are connected to the power supply paths 81 and 82.

The power supply system 100 mainly includes a known in-vehicle power storage unit 91 (hereinafter also called a "power storage unit 91"), a generator 92, the power supply paths 81 and 82, an in-vehicle power supply device 1 (hereinafter also referred to as a power supply device 1), and the like, and is configured as a system that can supply electric power to a load 98 and other loads. In the power supply system 100, the power storage unit 91, the generator 92 and the like are electrically connected to the power supply path 81 that is a conductive path of the high-voltage system, and a load 98 of the low-voltage system is connected to the power supply path 82 that is a conductive path of the low-voltage system. Although not illustrated, a load of the high voltage system such as a heater may also be connected to the power supply path 81 of the high-voltage system. The power supply paths 81 and 82 are wiring portions that function as power paths for transmitting electric power.

The power storage unit 91 is constituted by an in-vehicle power storage means such as an electric double-layer capacitor, a lead battery, a lithium ion battery, or the like. The output voltage of the power storage unit 91 in full charge is 48 V for example, and when the power storage unit 91 is fully charged, its high-potential terminal is maintained at about 48 V. The low-potential terminal of the power storage unit 91 is maintained at a ground potential (0 V), for example.

The generator 92 is configured as a known in-vehicle generator and has a function of generating electricity through rotation of a rotation shaft of an engine (not illustrated). The generator 92 applies an output voltage of, for example, a predetermined value V1 (for example, about 48 V) to the power supply path 81 while generating electricity. Although not shown, a starter, a load of the high-voltage system, and the like are connected to the power supply path 81. Note, that the generator 92 may also have a starter function.

The load 98 of the low-voltage system is a known in-vehicle electric component mounted in a vehicle, and may be any component that can operate using electric power supplied through the power supply path 82 that is connected to a second conductive path 32. The types and number of the loads 98 are not limited, and the loads 98 may be various kinds of devices such as a door lock system, a head light, a horn, an indoor lamp and the like.

The power supply device 1 is configured as a switching power supply device that can perform the step-down operation. This power supply device 1 includes a first conductive path 31, a second conductive path 32, a large output circuit 10 that is a first circuit unit, a dark current circuit 20 that is a second circuit unit, a capacitor 50, a current detection unit 42, and the like.

The first conductive path 31 is a conductive path to which the generator 92 that outputs a direct current voltage of the predetermined voltage V1 is electrically connected, and is configured as a high-voltage power supply line to which a voltage higher than that applied to the second conductive path 32 is applied while the vehicle is in operation. The first conductive path 31 is connected to the power supply path 81 and is electrically connected to the generator 92 and the power storage unit 91 via this power supply path 81. A voltage corresponding to an output of the generator 92 or the power storage unit 91 is applied to the first conductive path 31. In the example of FIG. 1, the terminal P1 is disposed at an end of the first conductive path 31, and the external power supply path 81 is connected to the terminal P1.

The second conductive path 32 is configured as a low-voltage power supply line to which a voltage lower than that applied to the first conductive path 31 is applied while the vehicle is in operation. While the large output circuit 10 is performing the step-down operation, an output voltage (e.g. an output voltage of about 12 V) from the large output circuit 10 is applied to the second conductive path 32. When the dark current circuit 20 performs the step-down operation, an output voltage (e.g. an output voltage of about 12 V) from this dark current circuit 20 is applied. In the example of FIG. 1, a terminal P2 is disposed at an end of the second conductive path 32, and the external power supply path 82 is connected to this terminal P2.

Figure 2:
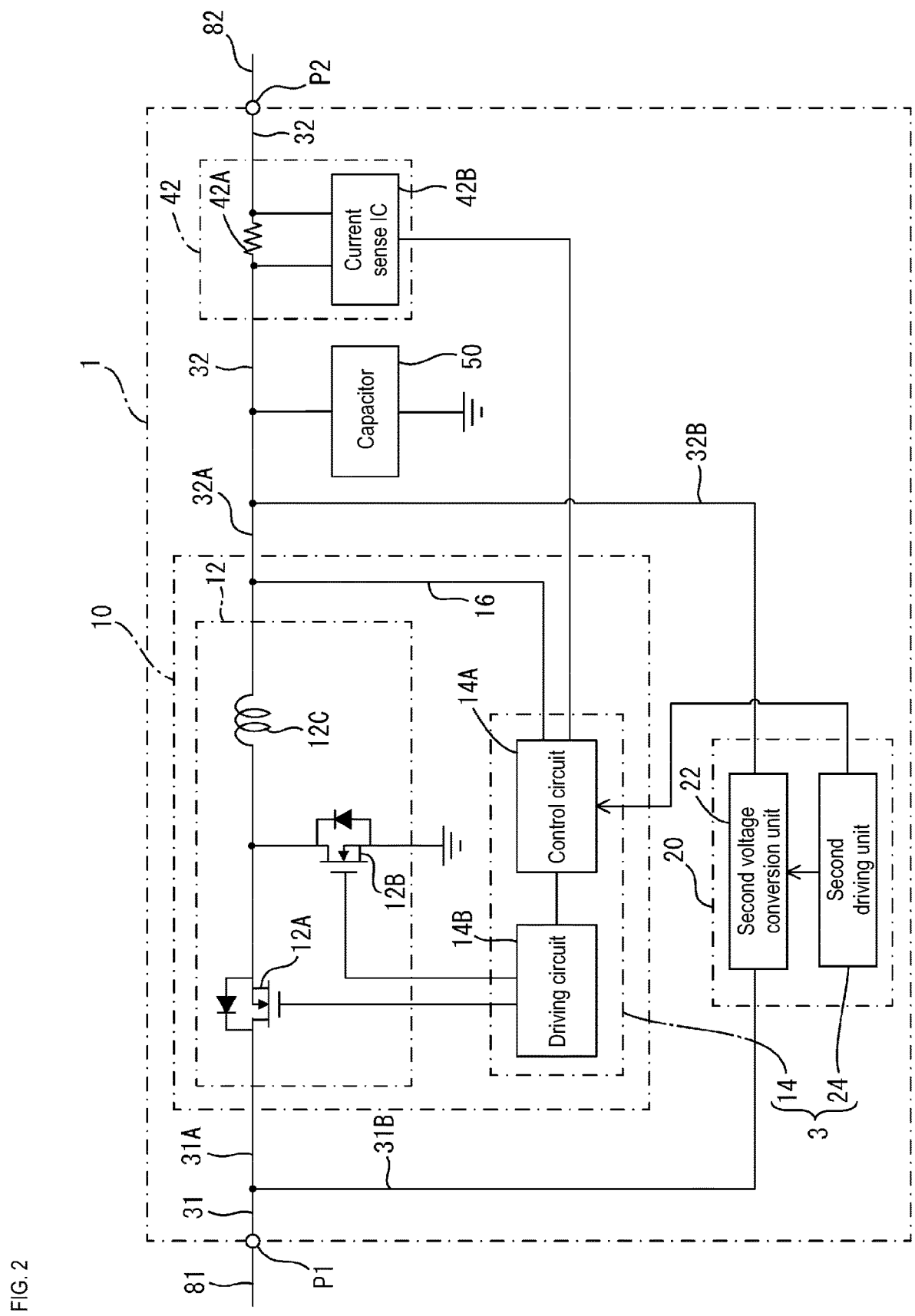
FIG. 2 is a circuit diagram illustrating a specific configuration of the in-vehicle power supply device according to the first embodiment, mainly showing a large current circuit in detail.

The large output circuit 10 shown in FIG. 2 is configured as a large capacity step-down DC/DC converter having a power capacity larger than that of the dark current circuit 20, and lowers a direct-current voltage applied to an input-side conductive path (the first conductive path 31) and outputs the lowered voltage to the output-side conductive path (the second conductive path 32). This large output circuit 10 is mainly constituted by a first voltage conversion unit 12, a first driving unit 14, a voltage detection unit 16, and the like.

The first voltage conversion unit 12 includes a high-side first element 12A that is disposed between an individual conductive path 31A that is branched from the first conductive path 31 and an individual conductive path 32A connected to the second conductive path 32 and that is configured as a semiconductor switching element electrically connected to the first conductive path 31; a low-side second element 12B that is configured as a semiconductor switching element electrically connected between the first conductive path 31 and ground; and an inductor 12C electrically connected between the first element 12A, the second element 12B, and the second conductive path 32. The first voltage conversion unit 12 constitutes a main part of the switching-type step-down DC/DC converter, and can perform the step-down operation to lower the voltage applied to the first conductive path 31 by switching the operation of the first element 12A between ON and OFF, and output the lowered voltage to the second conductive path 32. Note, that, although not illustrated, an input-side capacitor (not shown) is disposed between the individual conductive path 31A on the input-side and ground, and an output-side capacitor (not shown) is disposed between the individual conductive path 32A on the output-side and ground.

Both the first element 12A and the second element 12B are configured as N-channel MOSFETs, and one end of the first conductive path 31 is electrically connected to the drain of the high-side first element 12A via the individual conductive path 31A. The drain of the first element 12A is electrically connected to one electrode of an input-side capacitor (not shown), and also electrically connected to the high-potential terminal of the power storage unit 91 via the first conductive path 31 and the power supply path 81 (wiring portion), and thus a current can flow between them. Also, the drain of the low-side second element 12B and one end of the inductor 12C are electrically connected to the source of the first element 12A, and thus a current can flow between them. A drive signal and a non-drive signal from a driving circuit 14B provided in the first driving unit 14 can be input into the gate of the first element 12A, and the first element 12A is switched between the ON state and the OFF state in response to the signal from the driving circuit 14B. The source of the low-side second element 12B is connected to ground, while a drive signal and a non-drive signal from a driving circuit 14B can be input to its gate, and the second element 12B is switched between the ON state and the OFF state in response to the signal from the driving circuit 14B.

One end of the inductor 12C is connected to a connection node between the first element 12A and the second element 12B, and this end is electrically connected to the source of the first element 12A and the drain of the second element 12B. The other end of the inductor 12C is connected to the second conductive path 32 via the output-side individual conductive path 32A.

The voltage detection unit 16 is connected to the second conductive path 32 via the individual conductive path 32A and inputs, to the control circuit 14A, a value corresponding to a voltage of the second conductive path 32. The voltage detection unit 16 may be any known voltage detection circuit that can input a value indicating a voltage of the second conductive path 32 to the control circuit 14A. For example, the voltage detection unit 16 may be a circuit that directly inputs a voltage of the individual conductive path 32A to the control circuit 14A, as shown in FIG. 2, but it may also be configured as a voltage-dividing circuit that divides the voltage of the second conductive path 32 and inputs the divided voltage to the control circuit 14A.

The first driving unit 14 includes the control circuit 14A and the driving circuit 14B. The control circuit 14A is configured as a microcomputer, for example, and includes a CPU for performing various kinds of computational processing, a ROM for storing information such as programs, a RAM for temporarily storing generated information, and an A/D converter for converting an input analog voltage to a digital value. Detection signals (analog voltage signals corresponding to the detected voltages) from the voltage detection unit 16 and detection signals (analog voltage signals corresponding to the detected currents) from the current detection unit 42 are supplied to the A/D converter. In this configuration, the driving unit 3 is constituted by the first driving unit 14 and the later-described second driving unit 24, and this third driving unit 3 drives the first voltage conversion unit 12 and the second voltage conversion unit 22.

The current detection unit 42 detects a current flowing through the second conductive path 32 outside of the large output circuit 10. This current detection unit 42 includes a resistor 42A and a current sense IC 42B, for example, and outputs a value indicating a current flowing through the second conductive path 32. A drop in the voltage across the resistor 42A due to an output current flowing through the second conductive path 32 is amplified by the current sense IC 42B (e.g. differential amplifier), serving as a detected voltage (analog voltage) corresponding to the output current, and input to the control circuit 14A, for example. Then, this detected voltage (analog voltage) is converted into a digital value by the not-shown A/D converter included in the control circuit 14A.

When causing the first voltage conversion unit 12 to perform the step-down operation, the control circuit 14A performs a known feedback computation such that the voltage value in the second conductive path 32 is brought close to the target voltage value, while monitoring a detection signal from the voltage detection unit 16 and a detection signal from the current detection unit 42, and generates a PWM signal for which the voltage value in the second conductive path 32 has been adjusted and brought close to the target voltage value. The driving circuit 14B applies an ON signal for turning ON the first element 12A and the second element 12B alternatively in a control period for each, to the gate of the first element 12A and the gate of the second element 12B, based on the PWM signal supplied from the control circuit 14A. The phase of the ON signal that is applied to the gate of the first element 12A is approximately inverse to that of the ON signal that is supplied to the gate of the second element 12B, and a so-called dead time of the ON signals is ensured.

The large output circuit 10 functions as the step-down DC/DC converter using a synchronous rectification method, and lowers a direct-current voltage applied to the first conductive path 31 by switching the operation of the low-side second element 12B between ON and OFF in synchronization with the operation of the high-side first element 12A, and outputs the lowered voltage to the second conductive path 32. The output voltage of the second conductive path 32 is set in accordance with the duty ratio of a PWM signal supplied to the gate of the first element 12A. Through the operation described above, the large output circuit 10 performs the step-down operation while performing feedback control such that the voltage of the second conductive path 32 reaches the target value (e.g. 12 V). The current value (first allowable current value) that is allowed in the large output circuit 10 is larger than the later-described current value (second allowable current value) that is allowed in the dark current circuit 20, and is about 200 A, for example.

Figure 3:
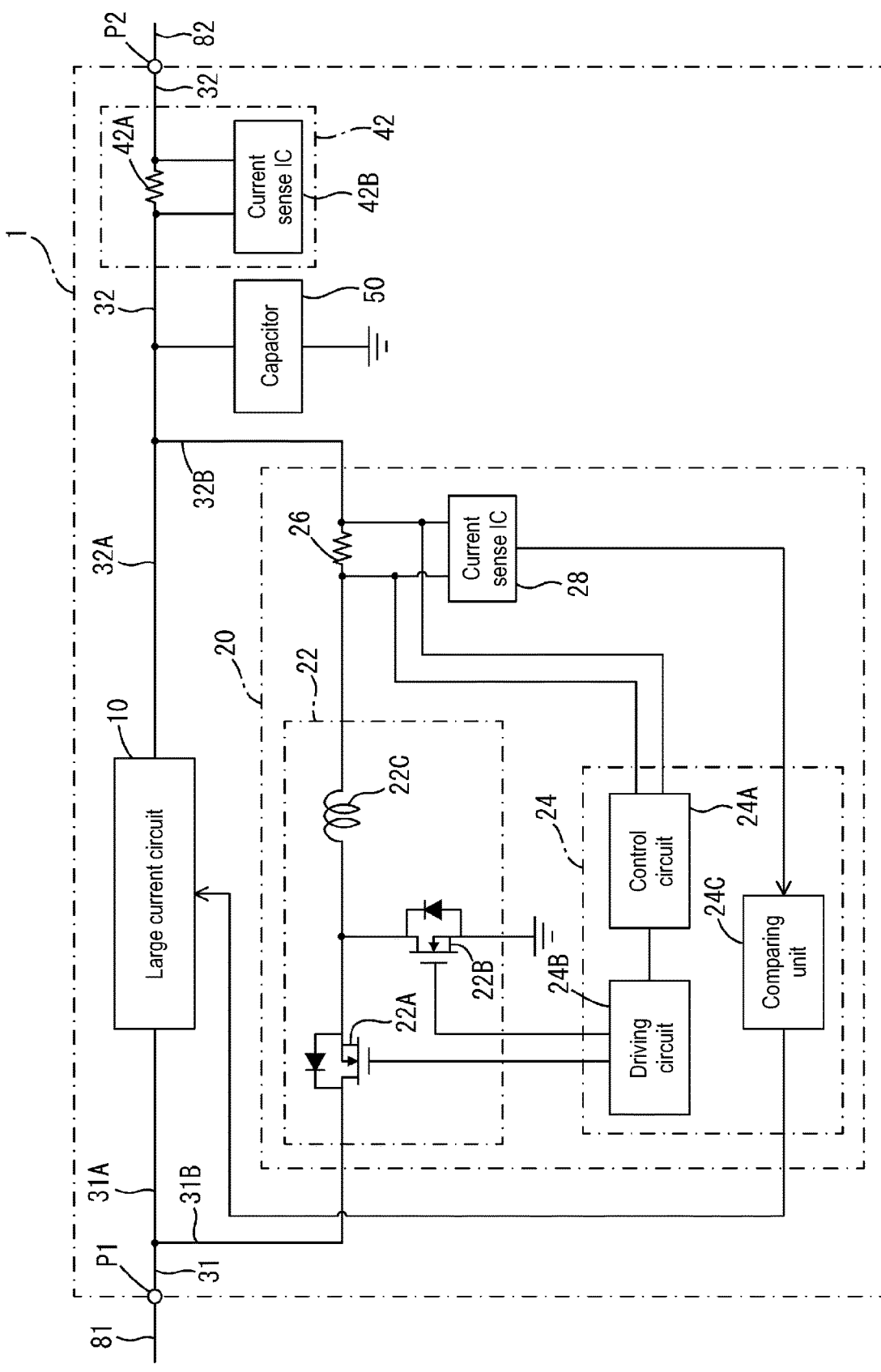
FIG. 3 is a circuit diagram illustrating a specific configuration of the in-vehicle power supply device according to the first embodiment, mainly showing a dark current circuit in detail.

The dark current circuit 20 shown in FIG. 3 is configured as a small capacity step-down DC/DC converter having a power capacity smaller than that of the large output circuit 10, and lowers a direct-current voltage applied to the input-side conductive path (first conductive path 31) and outputs the lowered voltage to the output-side conductive path (second conductive path 32). This dark current circuit 20 mainly includes a second voltage conversion unit 22, a second driving unit 24, a resistor unit 26, a current sense IC 28, and the like.

The second voltage conversion unit 22 is a converter section that has the same circuit configuration as the first voltage conversion unit 12 and that operates similarly to the first voltage conversion unit 12. Note, that the sizes of the first element 22A and the second element 22B that are configured as MOSFETs, are made smaller than that of the first element 12A and the second element 12B, and the size of the inductor 22C is also made smaller than that of the inductor 12C. The second voltage conversion unit 22 constitutes a main part of the switching-type step-down DC/DC converter, and can perform a step-down operation to lower a voltage applied to the first conductive path 31 by switching the operation of the first element 22A between ON and OFF using a synchronous rectification method, and outputs the lowered voltage to the second conductive path 32. Note, that, although not illustrated, an input-side capacitor (not shown) is disposed between the input-side individual conductive path 31B and ground, and an output-side capacitor (not shown) is disposed between the output-side individual conductive path 32B and ground. The power capacity of the second voltage conversion unit 22 is smaller than that of the first voltage conversion unit 12, and the allowable power that can be output is smaller than that of the first voltage conversion unit 12. Specifically, the first voltage conversion unit 12 can let a current flow that is significantly larger than the second voltage conversion unit 22.

The second driving unit 24 includes: a control circuit 24A configured as a switching IC; a driving circuit 14B configured as a FET driver, and a comparing unit 24C for comparing an output (voltage corresponding to a current flowing through the individual conductive path 32B) from the current sense IC 28 with a reference voltage.

The voltages at the two ends of the resistance unit 26 that is interposed in the individual conductive path 32B are input to the control circuit 24A, and thus a current flowing through the individual conductive path 32B (i.e. an output current from the second voltage conversion unit 22) can be grasped. When causing the second voltage conversion unit 22 to perform the step-down operation, the control circuit 24A performs a known feedback computation so that the voltage value of the second conductive path 32 is brought close to the target voltage value while monitoring the voltages of the two ends of the resistor unit 26, and generates a PWM signal that has been adjusted so that the voltage value of the second conductive path 32 is brought close to the target voltage value. The driving circuit 24B applies, to the gate of the first element 22A and the second element 22B, the ON signal for turning ON the first element 22A and the second element 22B alternatively in each control cycle based on the PWM signal supplied from the control circuit 24A. The phase of the ON signal that is applied to the gate of the first element 22A is approximately inverse to that of the ON signal that is supplied to the gate of the second element 22B, and a so-called dead time of the ON signals is ensured.

The current sense IC 28 amplifies a drop in the voltage across the resistor unit 26 due to the current flowing through the individual conductive path 32B, namely, the current flowing from the second voltage conversion unit 22 to the second conductive path 32, and outputs the detected voltage (analog voltage) corresponding to the current flowing through the individual conductive path 32B.

The comparing unit 24C compares a voltage signal from the current sense IC 28 with the reference voltage, and if the voltage signal is more than or equal to the reference voltage, outputs a predetermined signal (current surge signal), and if not, outputs another signal (non-detection signal). Note, that the lowest threshold value of a "predetermined current value range" is the current value of the individual conductive path 32B (i.e. the current value of the second conductive path 32) when the voltage output from the current sense IC 28 becomes the reference voltage when only the second voltage conversion unit 22, out of the first voltage conversion unit 12 and the second voltage conversion unit 22, is operating. That is, the range that is more than or equal to this lowest threshold value is the "predetermined current value range", and when the voltage output from the current sense IC 28 becomes the reference voltage, the current of the second conductive path 32 reaches the "predetermined current value range". If the current value of the second conductive path 32 reaches the "predetermined current value range" when only the second voltage conversion unit 22, out of the first voltage conversion unit 12 and the second voltage conversion unit 22, is operating (i.e., a current flowing through the second conductive path 32 has increased to the extent that the voltage output from the current sense IC 28 reaches the reference voltage or more), the comparing unit 24C outputs a predetermined signal (current surge signal). In this example, in the case where a current flowing through the second conductive path 32 reaches the "predetermined current value range" in the first period, the period after the reaching (i.e. the period after outputting the predetermined signal "current surge signal") corresponds to the second period.

The capacitor 50 is configured as a known capacitor such as an electric double layer capacitor. One end of this capacitor 50 is electrically connected to the second conductive path 32, and the capacitor 50 is charged by the current flowing through the second conductive path 32, that is, the current output to the second conductive path 32 by the large output circuit 10 or the dark current circuit 20. On the other hand, when only the dark current circuit 20 is operating, if the output current from the dark current circuit 20 becomes insufficient as a current to be supplied to the loads connected to the second conductive path 32, the current can be supplemented by discharge from the capacitor 50.

Next, specific operations performed by the power supply system 100 will be described in detail.

The power supply system 100 of FIG. 1 is, for example, a system that lowers the output of the power storage unit 91 connected to the power supply path 81 of the high-voltage system and supplies the lowered output to the power supply path 82 of the low-voltage system instead of the battery being connected to the power supply path 82 of the low-voltage system. Furthermore, the generator 92, a not-shown starter, and the like are provided in the power supply path 81 of the high-voltage system. With this kind of configuration, if the operation of the power supply device 1 is completely stopped while the vehicle is parking, for example, power is no longer supplied to the second conductive path 32, and the loads electrically connected to the second conductive path 32 cannot be driven. Therefore, in a predetermined period (first period) such as while the vehicle is parking, the power supply system 100 operates the dark current circuit 20 and stops the operation of the large output circuit 10 to supply power while suppressing the output current.

In this configuration, for example, a start time of "a first period" is set to the time when a start switch (e.g. ignition switch) installed in a vehicle provided with the power supply device 1 is switched from the ON state to the OFF state (i.e. when the vehicle is switched from an operating state to a parking state and the engine is stopped), and an end time of "the first period" is set to the time when a predetermined condition for driving the first voltage conversion unit 12 is satisfied. Here, "when the predetermined condition for driving the first voltage conversion unit 12 is satisfied" is the time when the comparing unit 24C outputs a predetermined signal (current surge signal) (i.e. when the current flowing through the second conductive path 32 has reached a "predetermined current value range") or the time when the ignition switch is switched from the OFF state to the ON state (i.e. when the engine is started), and whichever that comes earlier is set to the end time of "the first period". During this "first period", only the second voltage conversion unit 22, out of the first voltage conversion unit 12 and the second voltage conversion unit 22, is operated, and the step-down operation is performed while power consumption is suppressed.

On the other hand, in this "first time period", if a predetermined signal (current surge signal) is output by the comparing unit 24C (i.e. when a current flowing through the second conductive path 32 has reached the "predetermined current value range") or when the ignition switch has been switched to the ON state (i.e. when the engine is started), the control circuit 14A of the large output circuit 10 detects this state and then drives the first voltage conversion unit 12.

If a predetermined signal (current surge signal) is output from the comparing unit 24C shown in FIG. 3 in the above-described "first period", this predetermined signal (current surge signal) is input to the control circuit 14A. The control circuit 14A monitors inputs from the comparing unit 24C even in the "first period", does not drive the first voltage conversion unit 12 while the comparing unit 24C is outputting a non-detection signal in the first period, and if the predetermined signal (current surge signal) is input from the comparing unit 24C, starts the step-down operation of the first voltage conversion unit 12. If the control circuit 14A starts the step-down operation of the first voltage conversion unit 12, the control circuit 14A continues the step-down operation of the first voltage conversion unit 12 until a predetermined end time. The predetermined end time may also be, for example, the timing when the ignition switch is switched from the ON state to the OFF state, the timing when the current flowing through the second conductive path 32 becomes lower than a given value, the timing when the current flowing through the second conductive path 32 has been lower than a given value for a given period, or the like.

When performing this kind of operation, during the time from when the current flowing through the second conductive path 32 reaches the "predetermined current value range" until a sufficient current is output from the first voltage conversion unit 12, there is a risk of a time lag occurring to some extent. However, in this configuration, it is possible to perform discharging from the capacitor 50 during this period. Therefore, a larger current can be output in earlier stage, thus making it possible to prevent discomfort felt by a user due to a delay in outputting a large current.

Next, the effects of this configuration will be illustrated.

The in-vehicle power supply device 1 shown in FIG. 1 etc. operates only the second voltage conversion unit 22 with a smaller power capacity in the first period (e.g. when the ignition switch is in the OFF state), thus making it possible to continue the output while suppressing power consumption. Since it is sufficient that the circuit size of this second voltage conversion unit 22 is suited to a current that is assumed to flow in the first period, the circuit size does not need to be made unnecessarily large, and thus the circuit configuration can be easily optimized. On the other hand, when the first period is shifted to the second period, it is possible to let a larger current flow by driving the first voltage conversion unit 12 having a larger power capacity.

Furthermore, the capacitor 50 that can be charged by a current flowing through the second conductive path 32 is electrically connected to the second conductive path 32 that can be an output path from the first voltage conversion unit 12 and the second voltage conversion unit 22. With this kind of configuration, when the low-current operation performed by the second voltage conversion unit 22 is switched to the large-current operation performed by the first voltage conversion unit 12, it is possible to supplement the output current to be supplied to the load via the second conductive path 32 by a current from the capacitor 50. Accordingly, a delay until the first voltage conversion unit 12 outputs a large current can be suppressed.

The in-vehicle power supply device 1 includes the current detection unit 42 for detecting a current flowing through the second conductive path 32. The driving unit 3 operates such that, if the driving of first voltage conversion unit 12 is stopped and the second voltage conversion unit 22 is driven in the first period, the driving of the first voltage conversion unit 12 is started using, as the second period, the period after the current flowing through the second conductive path 32 detected by the current detection unit 42 reaches the "predetermined current value range".

According to this in-vehicle power supply device 1, if the driving of the first voltage conversion unit 12 is stopped and the second voltage conversion unit 22 is driven in the first period, that is, when operating while suppressing power consumption, the current flowing through the second conductive path 32 has increased to an extent to reach the "predetermined current value range", the driving of the first voltage conversion unit 12 can be started and a larger current can be output. Furthermore, during the period from when the current flowing through the second conductive path 32 reaches the "predetermined current value range" until a current is actually output from the first voltage conversion unit 12, the output can be supplemented by the current from the capacitor 50, thus making it possible to effectively suppress a delay until the first voltage conversion unit 12 outputs a large current.

Other Embodiments

The present disclosure is not limited to the embodiments described above with reference to the drawings, and the following embodiments are also encompassed within the technical scope of the present disclosure, for example. Also, the above-described embodiments and the following embodiments can be combined as long as no contradiction arises.

Although the above embodiments describe that the first voltage conversion unit 12 is a single-phase step-down DC/DC converter, the first voltage conversion unit may also be a multi-phase DC/DC converter constituted by a plurality of the voltage conversion units having a similar configuration to the first voltage conversion unit 12 in the above-described embodiments or any modification thereof.

Figure 4:
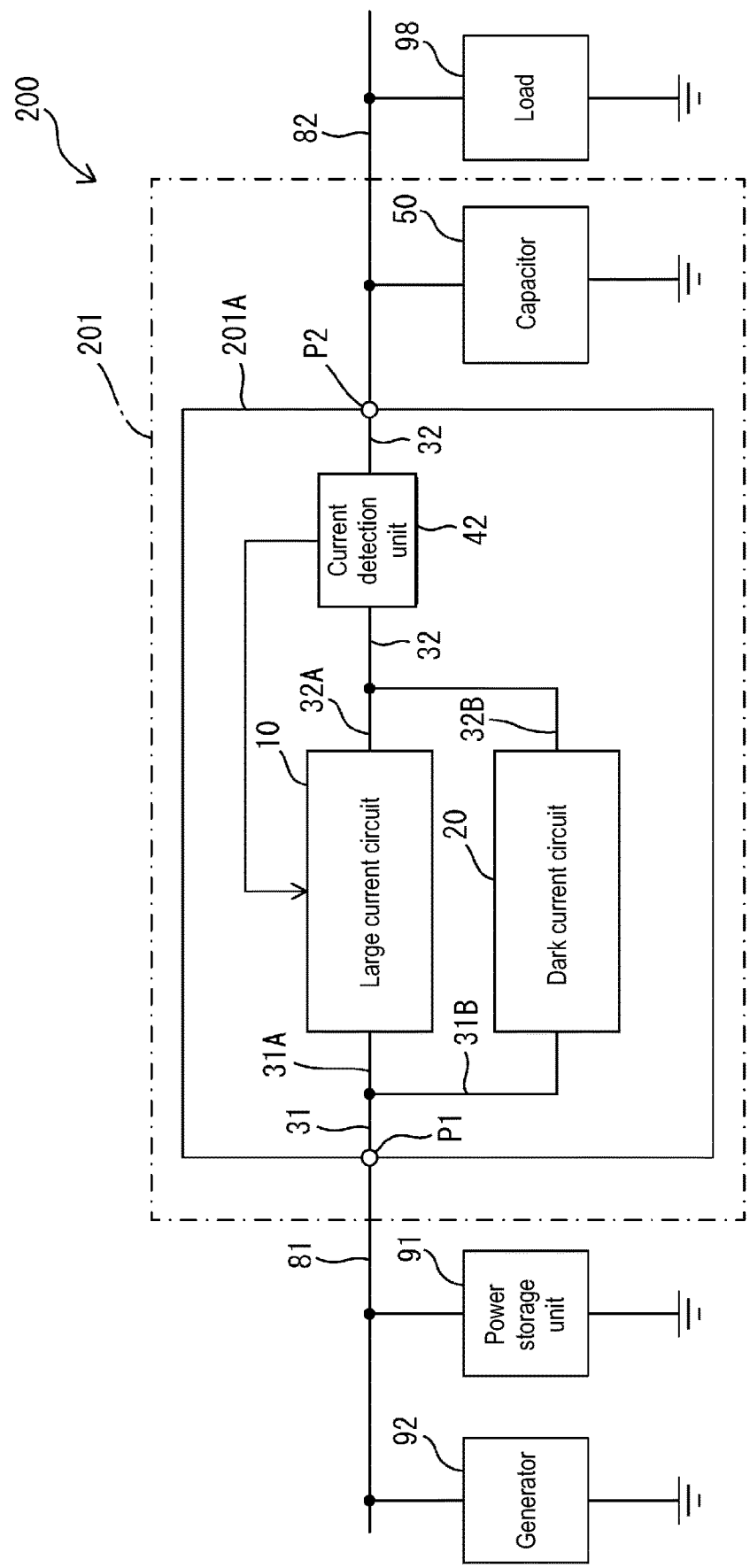
FIG. 4 is a block diagram schematically illustrating an in-vehicle power supply system that includes an in-vehicle power supply device according to another embodiment.

Although the above embodiments describe that, for example, the large output circuit 10, the dark current circuit 20, and the like are assembled with the capacitor 50 in one piece to form one circuit assembly (circuit module), and the circuit assembly constitutes the power supply device 1, the present disclosure is not limited to this example in the above embodiments or any modification thereof. A configuration is also possible in which, for example, as in a power supply device 201 shown in FIG. 4, the large output circuit 10, the dark current circuit 20, and the like are assembled with the capacitor 50 in one piece to form one circuit assembly 201A (circuit module), and the capacitor 50 is provided separately from this circuit assembly 201A. The power supply device 201 shown in FIG. 4 is different from that of embodiment 1 only in that the circuit module constituted by the large output circuit 10, the dark current circuit 20, and the like, and the capacitor 50 is separated, and has the same configuration as that of the embodiment 1 in other aspects.

Although the above embodiments describe that the driving of the first voltage conversion unit 12 is started when the current of the second conductive path 32 reaches a "predetermined current value range" in the first period, the present disclosure is not limited to this example in the above embodiments or any modification thereof. As in the power source device 301 shown in FIG. 5, for example, a configuration is also possible in which the comparing unit 24C compares the voltage of the individual conductive path 32B with the reference voltage, and if the voltage of the individual conductive path 32B is lower than the reference voltage (predetermined voltage value), a predetermined signal (voltage drop signal) is output, and if not, another signal (non-detection signal) is output. In this case, the case where the reference voltage (predetermined voltage value) is the lowest threshold of the "predetermined voltage value range" and the voltage of the individual conductive path 32B decreases below the reference voltage (predetermined voltage value) and the predetermined signal (voltage drop signal) is output is the case where the voltage of the second conductive path 32 decreases below the "predetermined voltage value range". The time when the voltage of the second conductive path 32 decreases below the "predetermined voltage value range" in the first period is the time when a predetermined condition for driving the first voltage conversion unit 12 is satisfied. In this example, when the predetermined signal (voltage drop signal) is output by the comparing unit 24C in the above-described "first period" (that is, when the voltage of the second conductive path 32 decreases below the "predetermined voltage value range"), this predetermined signal (voltage drop signal) is input to the control circuit 14A. The control circuit 14A monitors the input from the comparing unit 24C even in the "first period", does not drive the first voltage conversion unit 12 while the comparing unit 24C is outputting a non-detection signal in the first period, and if the predetermined signal (voltage drop signal) is input from the comparing unit 24C, causes the first voltage conversion unit 12 to perform the step-down operation. Note, that the in-vehicle power supply device 301 is the same as that of the embodiment 1 in all aspects other than that the above-described control and that the comparing unit 24C compares the voltage of the individual conductive path 32B with the reference voltage, and that the control circuit 14A starts the driving of the first voltage conversion unit 12 in response to the voltage drop signal.

According to this in-vehicle power supply device 301, when the driving of the first voltage conversion unit 12 is stopped and the second voltage conversion unit 22 is driven, that is, in the first period in which the operation is performed while suppressing power consumption, if the voltage of the second conductive path 32 has decreased below a "predetermined voltage value range", the driving of the first voltage conversion unit 12 can be started and a larger current can be output, using the period after the decrease as the "second period". Furthermore, during the period from when the voltage of the second conductive path 32 has decreased below the predetermined voltage value until a current is actually output from the first voltage conversion unit 12, the output can be supplemented by a current from the capacitor 50, and it is possible to effectively suppress a delay until the first voltage conversion unit 12 outputs a large current.

Although the above-described embodiments illustrate the period from when the start switch has switched from the ON state to the OFF state until a predetermined condition for driving the first voltage conversion unit 12 is satisfied as the "first period", the present disclosure is not limited to this example. It is sufficient that the condition for starting the "first period" is determined in advance as a condition for starting a mode (first mode) for operating only the second voltage conversion unit 22, out of the first voltage conversion unit 12 and the second voltage conversion unit 22. For example, in the above embodiments or any modification thereof, a configuration is also possible in which: after starting the operation of the first voltage conversion unit 12 in response to the current or voltage meeting the predetermined condition when the start switch (e.g. ignition switch) is in the OFF state, as in the above embodiment, if the state of the current or voltage of the second conductive path 32 enters a predetermined state (e.g. if a current flowing through the second conductive path 32 has decreased to be lower than or equal to a predetermined threshold current, or a voltage of the second conductive path 32 has increased to be higher than or equal to a predetermined threshold voltage, or if such a state has continued for a given period), the operation of the first voltage conversion unit 12 is stopped again and the above first mode (mode in which only the second voltage conversion unit 22 is operated) is switched to. In this case, the start condition of the first period is that "after starting the operation of the first voltage conversion unit 12 when the start switch is in the OFF state, the state of a current or voltage of the second conductive path 32 has entered the predetermined state". Also, the present disclosure is not limited to this example. The condition for starting the first period can be set in various ways, and the condition for ending the first period (a predetermined condition for driving the first voltage conversion unit 12) can also be set in various ways.

Although the above embodiment illustrates an ignition switch as a start switch, in any of the above embodiments or modification thereof, if the vehicle is an electric vehicle, a start switch may also be a switch for starting an EV system and the above embodiments can be similarly applied thereto.

DRAWINGS

Figure 5:
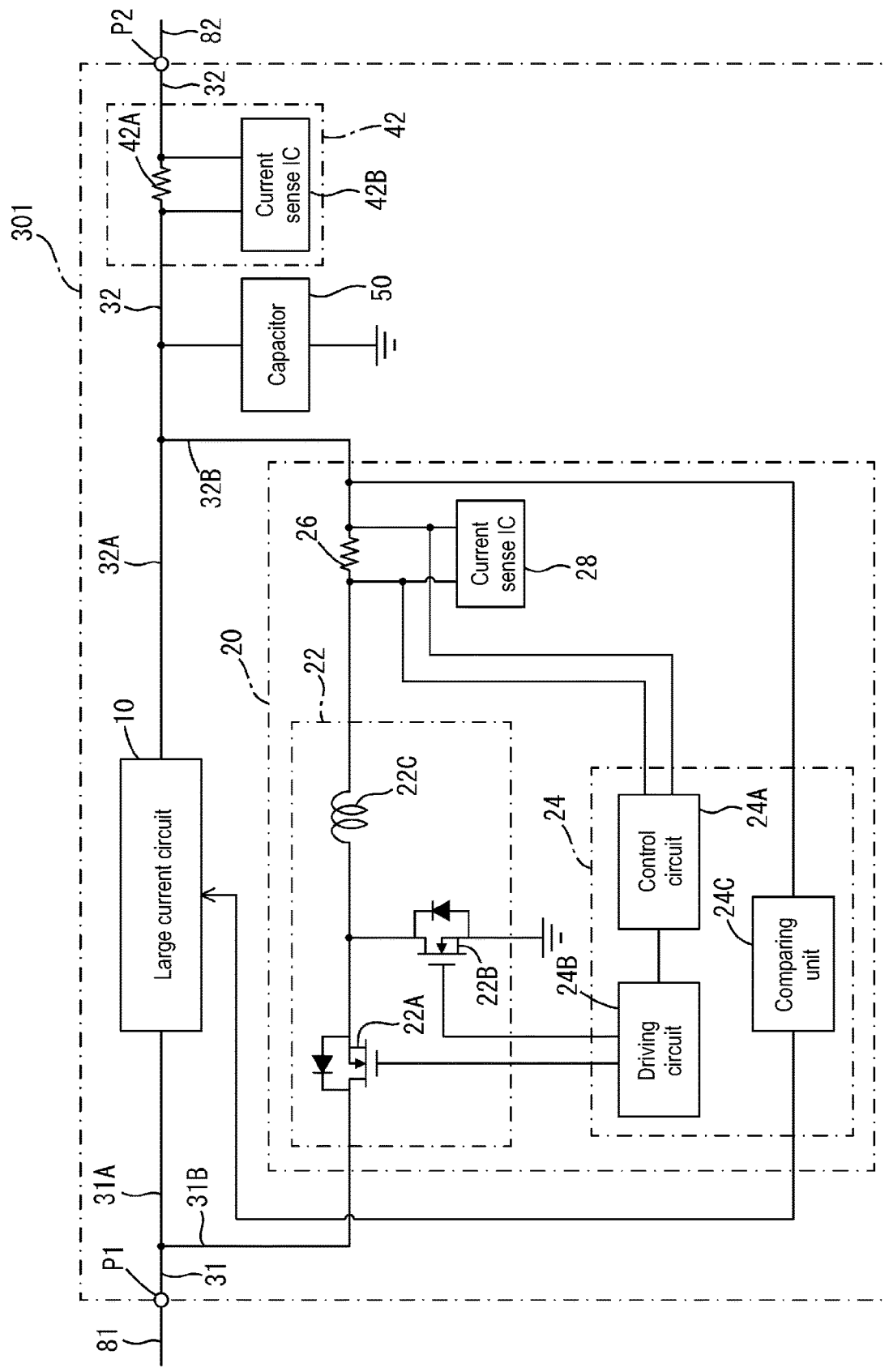
FIG. 5 is a block diagram schematically illustrating an in-vehicle power supply system that includes an in-vehicle power supply device according to another embodiment that is different from FIG. 4.

FIGS. 1, 4
10 Large current circuit
20 Dark current circuit
42 Current detection unit
50 Capacitor
91 Power storage unit
92 Generator
98 Load
FIG. 2
14A Control circuit
14B Driving circuit
22 Second voltage conversion unit
24 Second driving unit
42B Current sense IC
50 Capacitor FIGS. 3, 5
10 Large current circuit
24A Control circuit
24B Driving circuit
24C Comparing unit
28, 42B Current sense IC
50 Capacitor

The invention claimed is:
1. An in-vehicle power supply device comprising:
a first voltage conversion unit configured to perform at least a step-down operation to lower a voltage applied to a first conductive path electrically connected to an in-vehicle power storage unit, and apply the lowered voltage to a second conductive path;
a second voltage conversion unit configured to perform at least the step-down operation to lower a voltage applied to the first conductive path and apply the lowered voltage to the second conductive path, the second voltage conversion unit having a smaller power capacity than the first voltage conversion unit;
a driving unit configured to drive only the second voltage conversion unit, out of the first voltage conversion unit and the second voltage conversion unit, in a first period, and drive at least the second voltage conversion unit when the first period has shifted to the second period, and
a capacitor that is electrically connected to the second conductive path and is charged with a current flowing through the second conductive path,
wherein the capacitor is electrically connected to a wiring portion to which a battery is not connected and an in-vehicle load is connected, and
the driving unit is configured to start the driving of the first voltage conversion unit using, as a second period, a period after a current flowing through the second conductive path has reached a predetermined current value range or the voltage at the second conductive path has decreased below a predetermined voltage range, in the case where, in the first period, the driving of the first voltage conversion unit is stopped and the second voltage conversion unit is driven, and
when only the second voltage conversion unit, out of the first voltage conversion unit and the second voltage conversion unit, is driven, if the current output from the second voltage conversion unit becomes insufficient as a current to be supplied to the load, the current is supplemented by discharge from the capacitor.
2. The in-vehicle power supply device according to claim 1, wherein the first period is the period from when the start switch has switched from an ON state to an OFF state in a vehicle provided with the in-vehicle power supply device, to when a predetermined condition for driving the first voltage conversion unit is satisfied.

* * * * *